United States Patent [19]

Morimoto et al.

[11] Patent Number: 4,789,520
[45] Date of Patent: Dec. 6, 1988

[54] FUEL ASSEMBLY AND NUCLEAR REACTOR

[75] Inventors: Yuichi Morimoto, Hitachi; Hiromi Maruyama, Katsuta; Motoo Aoyama, Hitachi; Atsushi Zukeran; Yasunori Bessho, both of Mito; Tomoyuki Matsumoto, Katsuta; Yoshihiko Ishii; Kouji Fujimura, both of Hitachi; Sadao Uchikawa, Katsuta, all of Japan

[73] Assignee: Hitachi, Ltd., Tokyo, Japan

[21] Appl. No.: 77,513

[22] Filed: Jul. 24, 1987

[30] Foreign Application Priority Data

Aug. 1, 1986 [JP] Japan ................... 61-179970

[51] Int. Cl.$^4$ .............................................. G21C 3/00
[52] U.S. Cl. ...................................... 376/419; 376/428
[58] Field of Search ................................ 376/419, 428

[56] References Cited

U.S. PATENT DOCUMENTS 4,701,296 10/1987 Millot .................... 376/419

Primary Examiner—Donald P. Walsh
Attorney, Agent, or Firm—Antonelli, Terry & Wands

[57] ABSTRACT

A fuel assembly is composed of first fuel rods containing nuclear fuel material and burnable poison material and second fuel rods containing nuclear fuel material but no burnable poison material. The fuel assembly is charged in a high conversion area of a boiling water type nuclear reactor having a reactor core having the high conversion area and a burner area surrounding the high conversion area. A ratio $V_C/V_F$ is not greater than 1.5 in the fuel assembly where $V_C$ is the volume occupied by coolant flow paths and $V_F$ is the volume occupied by the nuclear fuel material per unit length in an axial direction of the fuel assembly. In addition, the burnable poison material is composed of neutron absorption nuclides having at least one resonant energy in a neutron energy region of one electron volt or less.

17 Claims, 10 Drawing Sheets

FUEL ASSEMBLY AND NUCLEAR REACTOR

BACKGROUND OF THE INVENTION

The present invention relates to a fuel assembly and a nuclear reactor, and more particularly to a fuel assembly suitable for use in a high conversion area of a light water moderation type nuclear reactor and a boiling water reactor having a high conversion area.

Methods of utilizing nuclear fuel in a light water moderation type nuclear reactor (hereinafter referred to as a light water reactor) are roughly classified into a "once-through" method and a reprocessing or recycling method. With the "once-through" method, the light water reactor uses the enriched uranium and in this method, none of the fuel materials contained in the used fuel rods which are taken out of the light water reactor is reused or recycled in the light water reactor. The "once-through" method or system is advantageous in terms of the fuel running cost in the case where the cost of reprocessing fuel is higher than that of enriching uranium.

One method to effectively use the fuel materials by the "once-through" method is to greatly increase the take-out burnup from the fuel assembly, that is, to realize a high efficiency of the burnup. It is required to raise the enrichment of the uranium-235 to achieve the high degree of the burnup, but the raised enrichment of the uranium would suffer from the following problems: In the center of the reactor core of the light water reactor there are the fuel assemblies with large difference in the neutron infinite multiplication factor because of a high enrichment of the new fuel assemblies and the large take-out burnup, thus developing a difference in the output power share proportions of the individual fuel assemblies accompanied by the larger output power mismatch and the increased output power peaking. Furthermore, as the enrichment increases, the surplus reactivity which has to be controlled in the initial stage of the burning increases.

Japanese Patent Unexamined Publication No. 129594/1986 (which has a U.S. equivalent, U.S. patent application Ser. No. 800,266 filed on Nov. 21, 1985 and a European equivalent, EPC laid-open application No. 184134 published on June 11, 1986) shows boiling water reactors and pressurized water reactors which are light water reactors having reactor cores to eliminate the above-described problems and to realize a high degree of burnup through highly enriched uranium. These reactor cores are used to improve the conversion of uranium-238 that is the fuel fertile material into nuclear fissile material (plutonium-239, further to effectively burn the nuclear fissile plutonium produced within the nuclear cores and the enriched uranium-235 and to effectively utilize the nuclear fuel material according to the oncethrough method. More specifically, as shown in FIG. 1, a reactor core 1 is divided in the radial direction into two area by a tubular partition member 2, and these areas are different from each other in ratio of the number of uranium atoms to that of hydrogen atoms (the ratio will hereinafter be referred to as $\gamma H/U$). Such a reactor core 1 is composed of fuel assemblies A each having a small ratio $\gamma H/U$ ($=1.0$) as shown in FIG. 2 and fuel assemblies B each having a large ratio $\gamma H/O$ ($=5.0$), these assemblies A and B being charged in the burnup region. Each of the fuel assemblies A and B has a number of fuel rods 3 arranged in a regular triangular lattice. The fuel assembly B is provided with burnable poison rods 4. In contrast, the fuel assembly A is not provided with any burnable poison rod. The fuel assemblies A are charged or loaded in the high conversion area inside the tubular partition member 2 in a first half of the reactor core entire life, and are reassembled into the fuel assemblies B. Thereafter, the fuel assemblies B are charged or loaded in the burnup area outside the tubular partition member 2 in the final half of the reactor core entire life. In other words, the fuel assemblies are loaded during the initial half stage of the reactor core entire life in the area where $\gamma H/U$ is small and the neutron spectrum is hard (high conversion area) to convert the fuel fertile material into the nuclear fissile material, and are loaded in the final half stage of the reactor core entire life in the area where $\gamma H/U$ is large and the neutron spectrum is soft (burner area) to effectively burn the nuclear fissile material. The dependency of the neutron infinite multiplication upon the burnup during these processes is shown in FIG. 4. In the high conversion area in which the highly condensated uranium fuel, that is, the new fuel assembly is loaded, the neutron infinite multiplication is low, whereas, in the burner area in which the half-burnt fuel assembly is loaded, the neutron infinite multiplication factor is high. Therefore, it is possible to reduce the output mismatch and to suppress the surplus reactivity of the new fuel assemblies.

SUMMARY OF THE INVENTION

An object of the present invention is to provide a fuel assembly and a nuclear reactor which are capable of reducing a change in reactivity concomitant with a change in amount of voids.

Another object of the present invention is to prevent the existence of the burnable poison material in an upper region.

According to the present invention, a ratio $R_F$ of a volume $V_C$ occupied by coolant paths to a volume $V_F$ occupied by nuclear fuel material within the fuel assembly ($R_F = V_C/V_F$) is not greater than 1.5, and there is included a burnable poison material consisting of neutron absorption nuclides having at least one resonant energy in a neutron energy region where a kinetic energy of the neutrons is not greater than one electron volt. The neutron energy region where the kinetic energy of the neutrons is not greater than one electron volt will be referred to as a thermal neutron energy region, and the neutrons having the energy in the thermal neutron energy region will be referred to as thermal neutrons.

In the fuel assembly having the ratio $R_f$ of the volume $V_C$ to the volume $V_F$ which is not greater than 1.5, the burnable poison material consisting of the neutron absorption nuclides having at least one resonant energy in the neutron energy region not greater than one electron volt has such characteristics that the poison material reactivity value is largely decreased as the ratio $R_F$ is reduced. Accordingly, in the fuel assembly having the ratio $R_F$ not greater than 1.5, the poison material reactivity value of the burnable poison material is increased as the ratio $R_F$ is increased (that is, the amount of the voids is small), whereas the poison material reactivity value is decreased as the ratio $R_f$ is decreased, thus making it possible to reduce the reactivity of the fuel assembly concomitant with the change in void rate.

DETAILED DESCRIPTION OF THE PREFERRED EMBODIMENT

Figure 16:
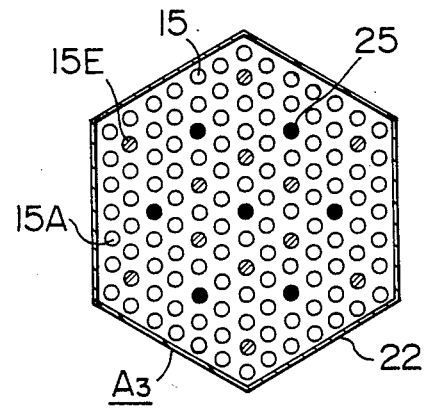
FIG. 16 is a cross-sectional view taken along the line XVI—XVI of FIG. 15.

The present invention is made on the basis of the detailed studies of the characteristics of boiling water reactors shown in FIG. 16 of the aforesaid Japanese Patent Unexamined Publication No. 125959/1986 (FIG. 16 of the US equivalent or the European equivalent) assigned to the present assignee. As a result, it has been apparent that the above-described boiling water reactors each having the high conversion area and the burner area surrounding the high conversion area would suffer the following problems. In the boiling water reactor, a light water that is used as both a coolant and a moderator is made to flow into a lower portion of the reactor core, thereby removing heat from a fuel assembly charged within the reactor core. In this process, the light water is converted from a non-boiled condition into a boiled condition. It has been found that, during this process, there is a problem that the reactivity change concomitant with the density change of the light water in the high conversion area in which the fuel assemblies arranged in a type lattice are charged is larger than that in the conventional boiling water nuclear reactor. Also, it has been found that the reactivity difference between the reactor operating state and the cold stop state of the reactor proposed in the above-described Japanese publication is larger than that of the conventional reactor.

The present inventors have been made various studies in order to overcome the above-noted problems or difficulties. In particular, the present invention has been made by the present inventors on the basis of the studies of a behavior of burnable poison material under a burnable poisonous condition in the state where the fuel assemblies are charged in the boiling water reactor. The present invention will be described on the basis of these studies.

Boron (B) and gadolinium (Gd) are used in a conventional boiling water reactor as typical burnable poison materials. In the conventional boiling water reactor, the burnable poison material is used in order to suppress the surplus reactivity. Namely, the poison materials is used to suppress the surplus reactivity of a new fuel assembly in an initial stage of the burner cycle.

Figure 5:
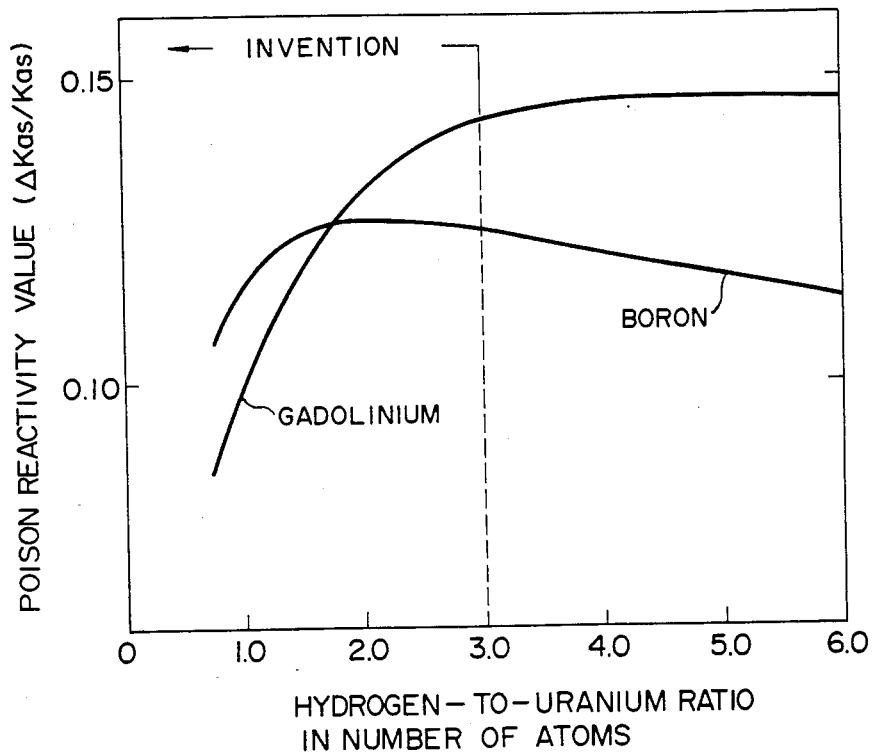
FIG. 5 is a graph showing a relationship between a ratio of the number of hydrogen atoms to that of uranium atoms and a poison reactivity value with respect to gadolinium and boron.

FIG. 5 shows the poison reactivity values of the boron and the gadolinium according to a ratio of hydrogen atoms to that of uranium atoms within the fuel assembly. In the conventional boiling water reactor, the ratio $R_F$ of a volume $V_C$ occupied by coolant paths to a volume $V_F$ occupied by nuclear fuel material per unit length in the axial direction of the fuel assembly in the effective fuel length within the fuel assembly is greater than 1.5 (3.0 in terms of the ratio of the number of the hydrogen atoms to that of the uranium atoms). For instance, Japanese Patent Unexamined Publication 74689/1982 (corresponding to U.S. patent application Ser. No. 620,020 filed on June 13, 1984) shows a fuel assembly in which the ratio of the cross-sectional area of the coolant flow path to the fuel cross-sectional area (which is the same as the ratio $R_E$) is 1.71 (see page 2, lower left column, lines 15 and 16 of that publication) and also a fuel assembly in which the ratio in cross-section is 1.9 or more (see page 1, left column lines 9 and 10 thereof). As is apparent from FIG. 5, in the conventional boiling water reactor, if boron or gadolinium is used, the poison reactivity value is kept constant in spite of the change of voids. In other words, even if the density of the moderator due to the void generation of the moderating light water (which is also used as the coolant) or the temperature difference between the operating state and the cold stop state is changed, the variable range of the poison reactivity value is kept small.

In contrast, in the case where the ratio $R_F$ is not greater than 1.5 (that is, the ratio of the hydrogen atom number to the uranium atom number is not greater than 3), the changes of the poison reactivity values are largely different between boron and gadolinium. In case of boron, even if the ratio $R_F$ is not greater than 1.5, the poison reactivity value change is small as in the conventional boiling water reactor, whereas in case of gadolinium, if the ratio $R_F$ is not greater than 1.5, the poison reactivity value change is large as shown in FIG. 5 with a remarkable reduction of the poison reactivity value thereof. Namely, when the density of the moderating material is changed, the reactivity that is controlled by gadolinium is largely changed. In the case where the ratio of the hydrogen atom number to the uranium atom number is not greater than 3.0, when the hydrogen-to-uranium ratio in the number of the atoms is small (that is, the ratio $R_F$ is small), the poison reactivity value due to the gadolinium is small, whereas when the hydrogen-to-uranium ratio in the number of the atoms is large (that is, the ratio $R_F$ is large), the poison reactivity value due to gadolinium is also large. This means that, when the voids are not produced and when the reactor is under the cold stop condition, the reactivity to be controlled by gadolinium is large, whereas when the void rate is high, the reactivity to be controlled by gadolinium is small. Such an effect is remarkable when the ratio $R_F$ is not greater than 1.3 (that is, the ratio of the number of the hydrogen atoms to that of the uranium atoms is not greater than 2.6). Therefore, it is more preferable to keep the ratio $R_F$ at 1.3 or less.

Figure 6:
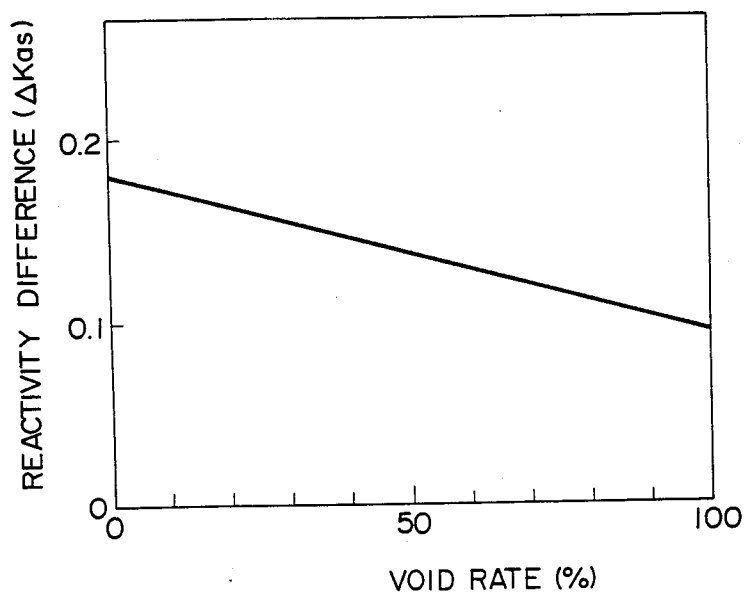
FIG. 6 is a graph showing a relationship between a void rate and the reactivity difference.

FIG. 6 shows the difference in reactivity between the fuel assembly including gadolinium and the fuel assembly including no gadolinium in the case where the ratio $R_F$ is kept at 1.2. As is apparent from FIG. 6, the reactivity difference that is obtained when the void rate is at 70% is approximately one half the reactivity difference that is obtained when the void rate is at 0%. As described before, in the case where the gadolinium is included in the fuel assembly under the condition that the rate $R_F$ is not greater than 1.5, the reativity difference between the condition of the void rate of 0% and the condition of the void rate of 70% is small. Accordingly, the reactivity difference is small between the lower portion of the fuel assembly having a low void rate and the upper portion of the fuel assembly having a high void rate, with respect to the axial direction of the fuel assembly. As a result, the output distribution is made uniform in the axial direction of the fuel assembly. Further, when the boiling water reactor is under the cold stop condition, the voids are not produced within the reactor core, and the ratio of the hydrogen atom number to the uranium atom number is larger than that obtained when the boiling water reactor is operated at a void rate of 0%. Therefore, the reactivity to be controlled by gadolinium becomes much larger. For this reason, the reactivity difference between the operation condition and the cold stop condition of the boiling water reactor is small, so that the reactor stop surplus capacity will be increased.

Figure 7:
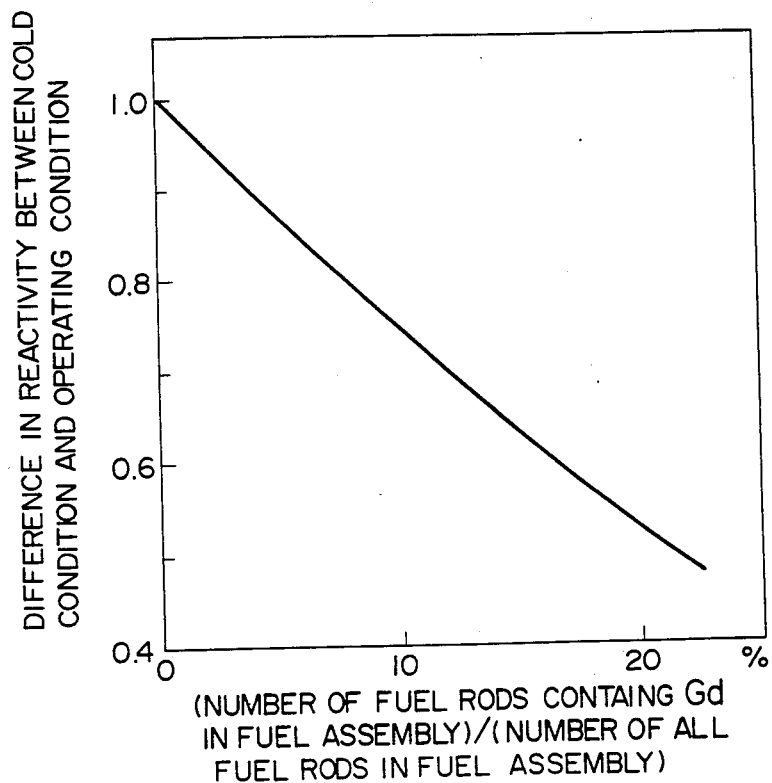
FIG. 7 is a graph showing a change in reactivity difference between the cold condition and the operating condition in terms of the ratio of the number of fuel rods containing gadolinium to that of all the fuel rods.

FIG. 7 shows the difference in reactivity between the operating condition and the cold condition of the boiling water reactor with respect to the rate of the fuel rods containing the gadolinium within the fuel assembly. When the gadolinium is added to 10% of the all the fuel rods, it is possible to reduce by 25% the reactivity difference between the operating condition and the cold condition of the boiling water reactor.

The difference in characteristics between boron and gadolinium as the poison materials as described above is due to the difference in change in reactive cross-sections of the neutrons of these materials with respect to the neutron energy of the neutron absorption nuclides. The effect of the poison material in the boiling water reactor depends upon the behavior of the reactive cross-section of the neutron absorption nuclides in the thermal neutron energy region, that is, under the condition of the neutron energy of one electron volt or less.

Figure 8:
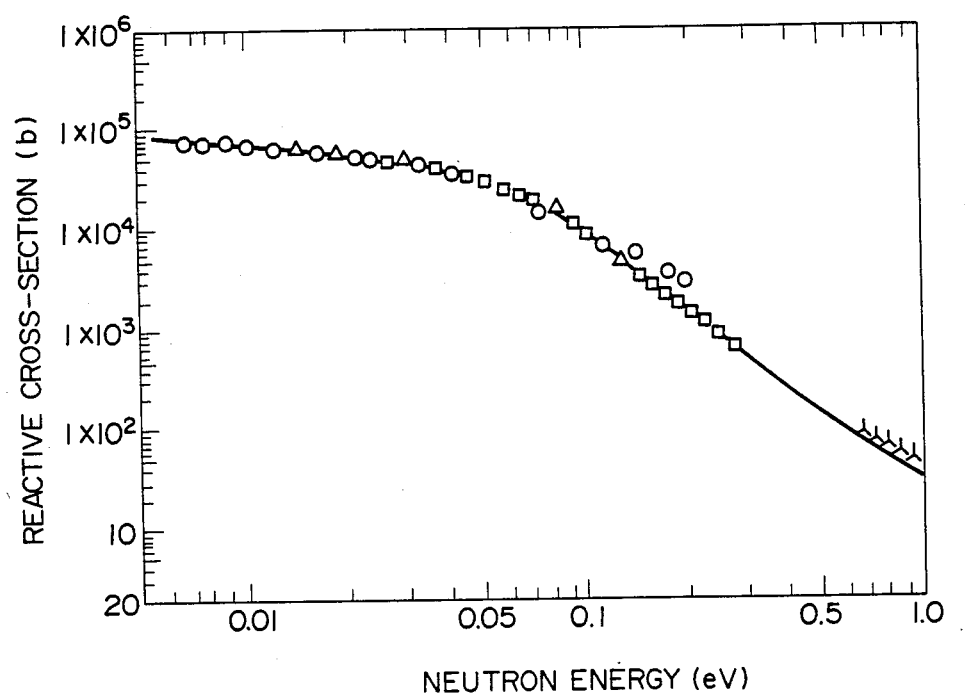
FIG. 8 is a graph showing a change in reactivity cross-section of gadolinium according to a neutron energy.

FIG. 8 shows the reactive cross-section in the thermal neutron energy region of the gadolinium. As is apparent from FIG. 8, when the neutron energy exceeds 0.03 eV, the decreasing rate of the reactive cross-section of the gadolinium is abruptly increased. This is caused by the existence of the resonant energy of the gadolinium at the position of the neutron energy of 0.03 eV. In contrast, in case of boron, the resonant energy is not present in the thermal neutron energy region, and the above-described behavior will not appear. The poison reactivity value of the boron is abruptly decreased below $\gamma H/U$ of 1.5 as shown in FIG. 5. This phenomenon is caused by the effect of the fuel material but not by the resonance. Such difference in reactive cross-section according to the neutron energy would cause the difference in effect of the poison materials. The neutron absorption nuclides having the resonant energy in the thermal neutron energy region may contain cadmium (Cd), samarium (Sm), tantalum (Ta) or the like in addition to gadolinium (Gd). The neutron absorption nuclides of these materials may ensure the same effect as that of the gadolinium.

Preferred embodiments of the invention based upon the above-described studies will now be described.

Figure 9:
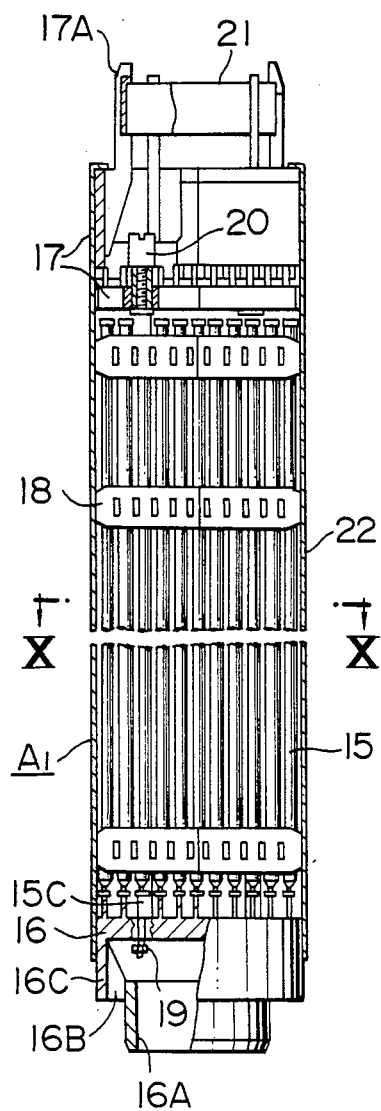
FIG. 9 is a longitudinal sectional view showing a fuel assembly in accordance with a preferred embodiment of the invention.
Figure 10:
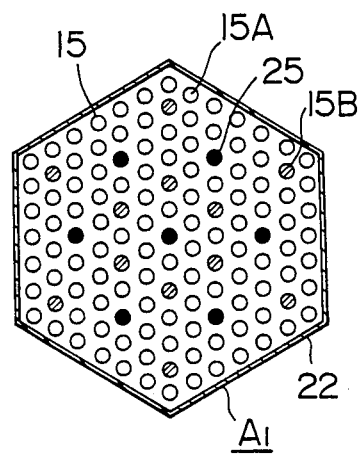
FIG. 10 is a cross-sectional view taken along the line X—X of FIG. 9.

A fuel assembly in accordance with one embodiment of the invention to be charged in a high conversion area (where the ratio $R_F$ is not greater than 1.5) within a reactor core of a boiling water type nuclear reactor will be explained with reference FIGS. 9 and 10.

A fuel assembly A1 in accordance with the preferred embodiment includes a plurality of fuel rods 15 arranged in rows, control rod guide tubes 25, a lower tie plate 16, an upper tie plate 17 and spaces 18. Reference numeral 21 denotes a handle. The fuel rods 15 are classified into three types of fuel rods 15A, 15B and 15C. The fuel rods 15A to 15C have fuel pellets of enriched uranium, respectively. A gadolinia ($Gd_2O_3$) containing gadolinium that is a burnable poison material is mixed into the fuel pellets of only the fuel rods 15B. No gadolinia is contained in the fuel rods 15A or 15C. The fuel rods 15C are used as tie rods for connecting the upper tie plate 17 and the lower tie plate 16 to each other. The upper tie plate 17 and the lower tie plate 16 have a regular hexagonal shape. The fuel rods 15A, the fuel rods 15B containing the gadolinia and the control rods guide tubes 25 are supported at opposite ends to the lower tie plate 16 and the upper tie plate 17, respectively. The lower tie plate 16 has a cylindrical portion 16A therein, which cylindrical portion 16A is connected to an outer cylindrical portion 16C through connecting plates 16B arranged radially. The handle 21 is mounted on connecting plates 17A of the upper tie plate 1. Some of the fuel rods 15 are used to function as the tie rods 15C. The opposite ends of the tie rods 15C are adapted to pass through the upper tie plate 17 and the lower tie plate 16. A nut 19 is mounted on the lower end of each tie rod 15C and a tightening nut 20 is attached to the upper end of the tie rod 15C.

The fuel rods 15 and the control rod guide tubes 25 are bundled by the spacers 18. The bundle of the fuel rods 15 is surrounded by a channel box 22 mounted on the upper tie plate 17. Voids produced by the boiling of light water that serves as both moderator and coolant are prevented from floating in the lateral direction (toward the adjacent fuel assemblies within the reactor core) by the channel box 22. In the embodiment, twelve of 120 fuel rods 15 are the fuel rods 15B including 2.5% by weight of gadolinia. A concentration of the gadolinia of each fuel rod 15B is kept uniform over an entire length of an effective length portion of the fuel rod 15B (i.e., an axial length of the fuel pellet filling region). The axial length of the fuel effective length portion of the fuel rod 15B is equal to the physical length of the other fuel rod 15 within the fuel assembly A1. As shown in FIG. 10, the fuel rods 15B containing gadolinia are disposed inwardly from the outermost row of fuel rods 15A which do contain gadolinia and are surrounded by such rods 15A. In the fuel assembly A1 of the embodiment, the ratio $R_F$ of the volume $V_C$ occupied by the coolant flow paths through which the light water, i.e., coolant flows, to the volume $V_F$ occupied by the nuclear fuel material is 1.2. In this case, the above-described volumes are expressed by volumes per unit axial length of the fuel assembly. The enrichment of each fuel rod 15 is at 6 wt % and is kept uniform over the entire length of the fuel effective length portion. The thus constructed fuel assembly A1 has a burnup of zero and will be first charged in the reactor core of the nuclear reactor. The light water is adapted to flow between the adjacent fuel rods within the channel box 22 through the lower tie plate 16 and to flow out of the upper tie plate 17.

In the boiling water reactor having a high conversion area (where the ratio $R_F$ is not greater than 1.5) of the reactor core into which the thus constructed fuel assembly A1 is charged, there would be produced a void distribution in a axial direciton of the fuel assembly under the operating condition, so that the void rate is at 0% in the lower portion of the fuel assembly A1, whereas the void rate is at about 70% at the upper end of the fuel assembly A1. Due to the existence of the voids, there would be a difference in neutron infinite multiplication factor between the upper and lower portion of the fuel assembly A1, and a peak of the output would be generated in the lower portion of the fuel assembly A1. However, in the fuel assembly A1 according to the embodiment shown, since the ratio $R_F$ is small and the gadolinium is included, the reactivity value of the gadolinium in the lower portion of the fuel assembly A1 having a low void rate is 3.0 times larger than that in the upper portion thereof. For this reason, the difference in neutron infinite multiplication factor between the upper and lower portions of the fuel assembly A1 is small, it is possible to make uniform the output distribution in the axial direction of the fuel assembly A1. Thus, according to the embodiment of the invention, it is possible to make uniform the output distribution in the axial direction by the change of the gadolinia reactivity factor, without any special technique to use an enrichment distribution in the axial direction of the fuel assembly as shown in U.S. Pat. No. 4,339,258.

In the boiling water reactor having the high conversion area of the reactor core into which the fuel assembly A1 is charged, under the cold condition, the voids will be eliminated within the high conversion area of the reactor core. Therefore, under the cold condition, the reactivity to be controlled by the gadolinium is increased in comparison with that in the operating condition. Thus, the reactor stop surplus capacity is increased. In comparison with the case where the fuel assembly A1 from which the gadolinia has been removed is charged in the high conversion area of the reactor core of the boiling water reactor, it is possible to reduce the difference in reactivity between the cold condition and the operating condition of the boiling water reactor by about 35% and to considerably improve the reactor stop surplus capacity in accordance with the fuel assembly containing the gadolinia as described before.

Figure 1:
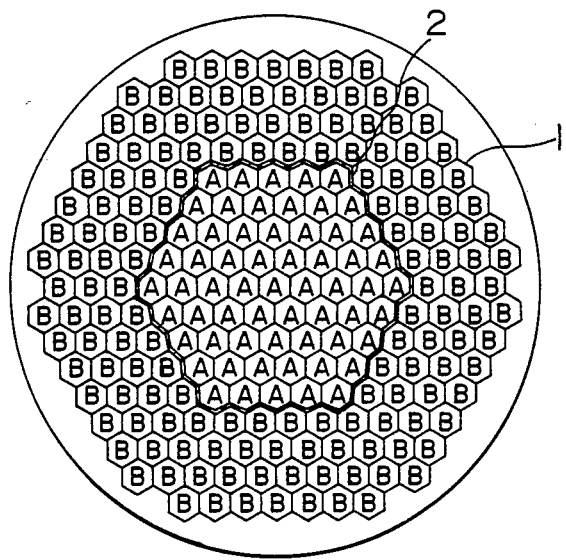
FIG. 1 is a cross-sectional view of a reactor core of a conventional nuclear reactor.
Figure 2:
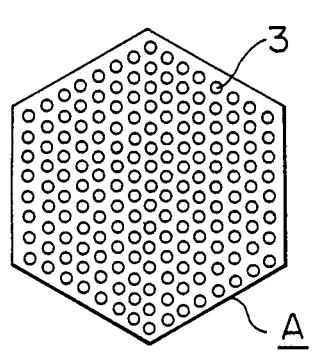
FIG. 2 is a cross-sectional view of a fuel assembly to be charged in a high conversion area of the reactor core shown in FIG. 1.
Figure 3:
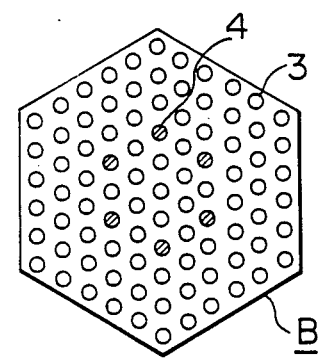
FIG. 3 is a cross-sectional view of a fuel assembly to be charged in a burner area of the reactor core shown in FIG. 1.
Figure 11:
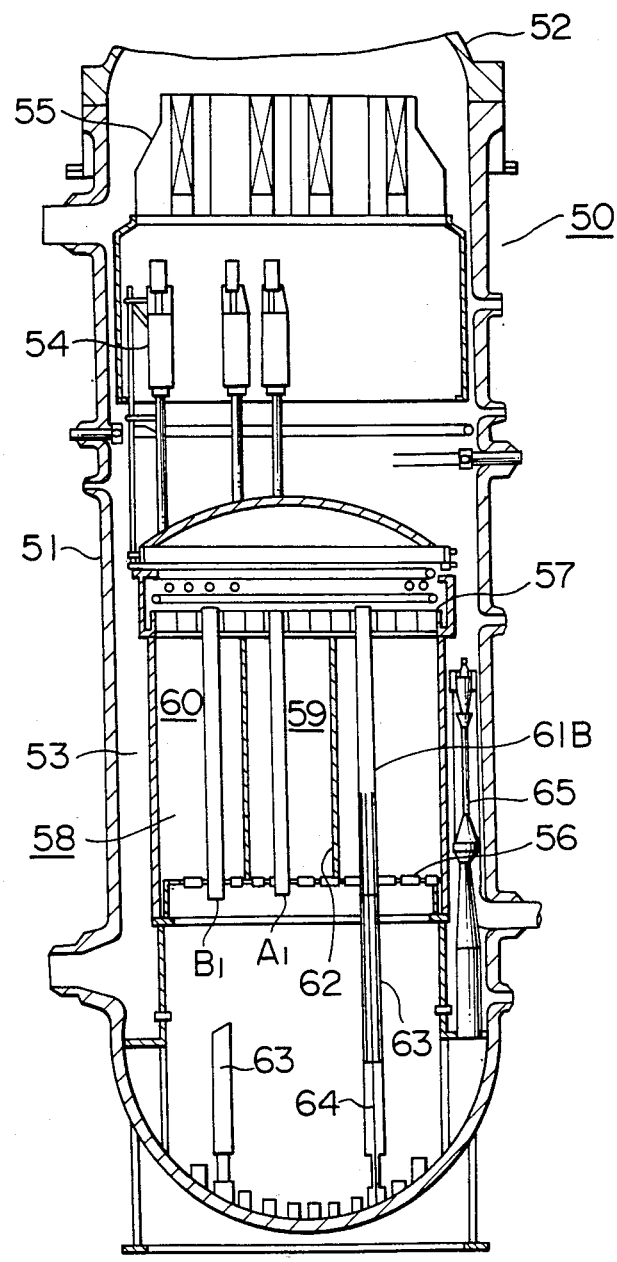
FIG. 11 is a longitudinal sectional view showing a boiling water reactor in which the fuel assembly shown in FIG. 9 is charged.

FIG. 11 shows an embodiment of a boiling water reactor in which the above-described fuel assembly A1 is charged. The boiling water reactor 50 according to the embodiment is provided with a nuclear reactor pressure vessel 51 which is tightly sealed by a seal lid 52 at its top. A reactor core shroud 53 is installed in the reactor pressure vessel 51. A steam separator 54 is mounted on the top end of the reactor core shroud 53, and a drier 55 is located above the steam separator 54. A lower reactor core support plate 56 and an upper reactor core support plate 57 are installed in the reactor core shroud 53. The upper section and lower section of a fuel assembly A1 and a fuel assembly B1 charged in the reactor core 58 are respectively supported by the lower reactors core support plate 56 and the upper core support plate 57. A cylindrical partition member 62 is installed between the lower reactor core support plate 56 and the upper reactor core support plate 57. The partition member 62 is adapted to divide the reactor core 58 radially into a central area 59 and a peripheral area 60. The assembly A1 is charged in the central area (high conversion area) 59 and the fuel assembly B1 is charged in the peripheral area (burner area) 60. In the fuel assembly B1, the ratio $R_F$ is increased to about 2.5 by reducing the number of the fuel rods 15 to one half of that of the fuel rods of the fuel assembly A1. The fuel assembly B1 includes fuel rods 4 containing gadolinia (burnable poison material) for suppressing a surplus reactivity as in the case of the fuel assembly B shown in FIG. 3. Two fuel assembly B1 are made by reassembling a single fuel assembly A1 removed from the centtral area 59. The fuel rods 4 are newly provided for the fuel assembly B1 when the fuel assembly B1 is assembled. Also in the fuel assembly B1, a plurality of control rod guide tubes 25 are provided. Reference numeral 65 denotes a jet pump that serves to supply to the reactor core 58 the light water which is the moderator and the coolant.

In the central area 59 in the embodiment, the ratio $R_F$ is 1.2 per unit length in the axial direction of the reactor core, whereas in the peripheral area 60 in the embodiment, the ratio $R_F$ is 2.5 per unit length in the axial direction of the reactor core. There is substantially no gas, or no light water between the adjacent fuel assemblies A1 charged in the central area 59 or between the adjacent fuel assemblies B1 charged in the peripheral area 60. If it is desired to form water gaps between the fuel assemblies, in particular in the high conversion area, i.e., central area 59, it is necessary to determine, upon designing the fuel assemblies, the ratio $R_F$ within the fuel assemblies A1 and a width of the water gaps between the fuel assemblies A1 so that the ratio $R_{F1}$ is not greater than 1.5, or more preferably, 1.3. The ratio $R_{F1}$ is the ratio $V_{C1}/V_{F1}$ of the volume $V_{C1}$ occupied by the coolant flow paths to the volume $V_{F1}$ occupied by the nuclear fuel material per unit length in the axial direction in the high conversion area.

A control rod driving mechanism (not shown) is attached to a mirror portion of a bottom of the reactor pressure vessel 51. A control rod guide tube 63 is provided in the reactor pressure vessel 51 and also is installed above the control rod driving mechanism on an extension line through the control rod driving mechanism. The lower end of a control rod 64 is detachably connected to the control rod driving mechanism. The control rod 64 is of the cluster type as shown in FIG. 7 of Japanese Patent Unexamined Publication No. 129594/1986, for example. The control rod 64 may move up and down within the control rod guide tube 63. The control rods 64 are provided with such a ratio that a single control rod 64 is provided per three fuel assemblies A1 and B1. An absorber rod of each control rod 64 extends upwardly. From below, the absorber rod of each control rod 64 is inserted into or removed from the control rod guide tube 63 of the fuel assembly A1 or B1 disposed in the central area 59 or peripheral area 60.

Figure 4:
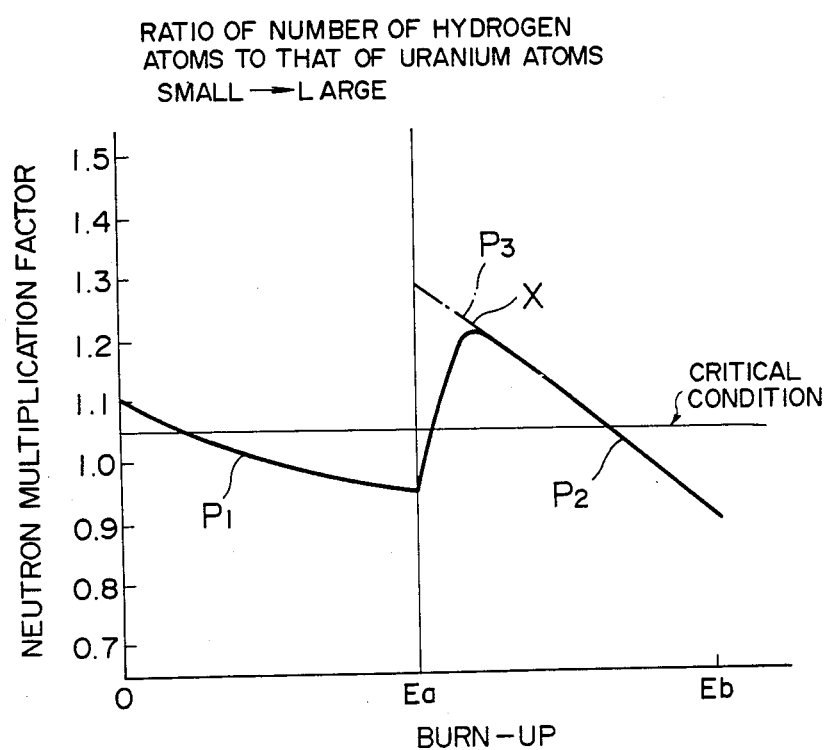
FIG. 4 is a graph showing a relationship between the burnup and the neutron multiplication factor.

When the fuel assembly A1 charged in the central area 59 reaches a limit burnup Ea (see FIG. 4), the fuel rods 15 assembled into the fuel assembly A1 are removed from the fuel assembly A1 and are used as constituents of the fuel assembly B1. Then, the fuel rods 15 constituting the fuel assembly B1 are charged in the peripheral area where the ratio $R_F$ is large and are continuously burned to the burnup Eb.

The fuel assembly A1 charged in the central area 59 and the fuel assembly B1 charged in the peripheral area 60 are present in the respective areas during a four-fuel-cycle. The amount of the gadolinium contained in each fuel assembly A1 is consumed during the first fuel cycle, and one fourth of the fuel assemblies A1 in the central area 59 are replaced by new fuel assemblies A1 (containing the gadolinium) after the completion of the operation of the first fuel cycle. For this reason, one fourth of the fuel assemblies A1 in the central area include the gadolinium. It is necessary to perform the fuel replacement so that the fuel assemblies containing the gadolinium are arranged uniformly in the central area 59. Also, the gadolinium amount of the fuel assemblies B1 is selected so that it is consumed during the one fuel cycle, and the fuel assemblies B1 are replaced by new fuel assemblies as in the case of the fuel assemblies A1. The amount of gadolinium within the fuel assemblies A1 may be set, if desired, so that it is consumed during the second fuel cycle.

In the boiling water type nuclear reactor in accordance with the foregoing embodiment, the output distribution in the axial direction in the central area, i.e., high conversion area 59 is made uniform, and the reactor stop surplus capacity is considerably improved due to the reduction in reactivity difference between the cold condition and the operating condition. These effects are due to the fact that the ratio $R_F$ of the high conversion area where the light water exists is not greater than 1.5, and that the gadolinium exists in this high conversion area. It is more preferable that the $R_F$ of the high conversion area be not greater than 1.3. To meet this condition, it is possible to considerably enhance the effect that may be obtained by the content of the gadolinium.

Figure 13:
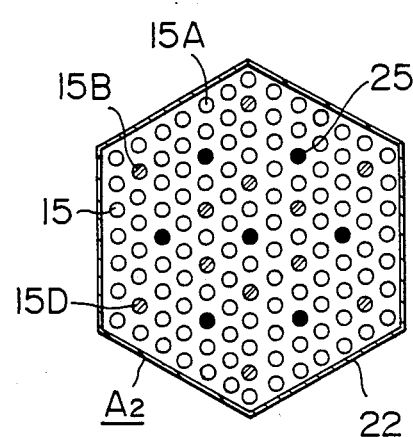
FIG. 13 is a cross-sectional view taken along the line XIII—XIII of FIG. 12.
Figure 14:
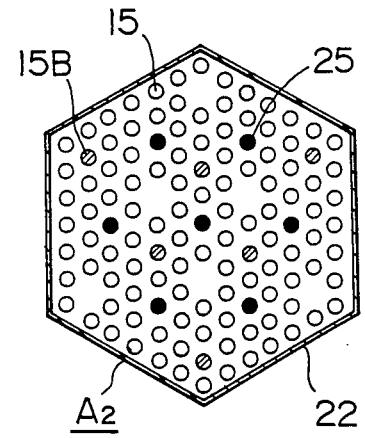
FIG. 14 is a cross-sectional view taken along the line XIV—XIV of FIG. 12.

Another embodiment of a fuel assembly to be charged in a high conversion area (where the ratio $R_F$ is not greater than 1.5) will now be described with reference to FIGS. 12 to 14. In the fuel assembly A2 according to the embodiment, six fuel rod 15D each having a short fuel effective length portion in comparison with the other fuel rods 15A to 15C are included in order to reduce the pressure loss within the fuel assembly A2. The upper end of each fuel rod 15D is located from the lower end of the fuel effective length portion of the fuel assembly A2 to one third of the overall length of the fuel effective length portion of the fuel assembly A2. The total number of the fuel rods 15B is six, and the fuel rods 15B and 15D include each 2.5 wt % of gadolinia. The concentration of the gadolinia is kept constant over the entire length of the fuel effective length portions of the fuel rods 15B and 15D. The enrichment of the fuel rods 15A to 15D is kept constant at 6 wt % over the entire length of the fuel effective length portion. In such a fuel assembly A2, the number of the fuel rods 15 in the lower portion (at a cross-section XIII—XIII) is 120, whereas the number of the fuel rods 15 in the upper portion (at a cross-section XIV—XIV) is 114. The ratio R per unit length in the axial direction is 1.20 in the lower portion of the fuel assembly A2 where the fuel rods 15D exist, and is 1.35 in the upper portion of the fuel assembly A2 where no fuel rod 15D extsts the total number of the fuel rods 15 is smaller. This embodiment ensures the same effect as that obtained in the embodiment shown in FIG. 9. In addition, the embodiment shown in FIGS. 12 to 14 may enjoy the following advantage. Namely, the average void rate of the upper portion of the fuel assembly A2 is small in comparison with the case where the fuel rods 15D having the fuel effective length portions are not used, and also the output distribution in the axial direction is made more uniform than that in the case where the fuel rods 15D are not used. The content of the burnable poison material of the fuel assembly A2 according to the present embodiment is determined by the following concept. As described before, a burnable poison material including neutron absorption nuclides having at least one resonant energy in the neutron energy region of one electron volt or less has a high reactivity in the case where the moderator amount is large, and a low reactivity in the case where moderator amount is small. Namely, under the condition of the ratio $R_F$ of 1.5 or less, the burnable poison material has a reactivity controlling effect in the lower portion of the fuel assembly where the void rate is small in the normal operating condition of the boiling water reactor, but this controlling effect is small in the upper portion of the fuel assembly. This phenomenon is utilized to determine the amount of the burnable poison material in the lower portion of the fuel assembly A2 so as to obtain a more uniform output distribution in the operating condition. On the other hand, since the void distribution is not present in the cold condition of the boiling water reactor, the amount of the burnable poison material of the fuel assembly, in particular, the accumulation amount of plutonium in the upper portion of the fuel assembly is increased. It is therefore important to determine the amount of the burnable poison material in the upper portion of the fuel assembly. Accordingly, the amount of the burnable poison material in the upper portion of the fuel assembly is determined so that the reactor stop surplus capacity may meet the design standards. On the basis of such basic concept, in the embodiment shown in FIG. 12, twelve fuel rods (fuel rods 5B and 15D) containing the gadolinia are arranged in the lower portion of the fuel assembly to make uniform the output distribution, and six minimum required fuel rods containing the gadolinia are arranged in the upper portion of the fuel assembly to meet the satisfactory reactor stop surplus capacity.

Figure 15:
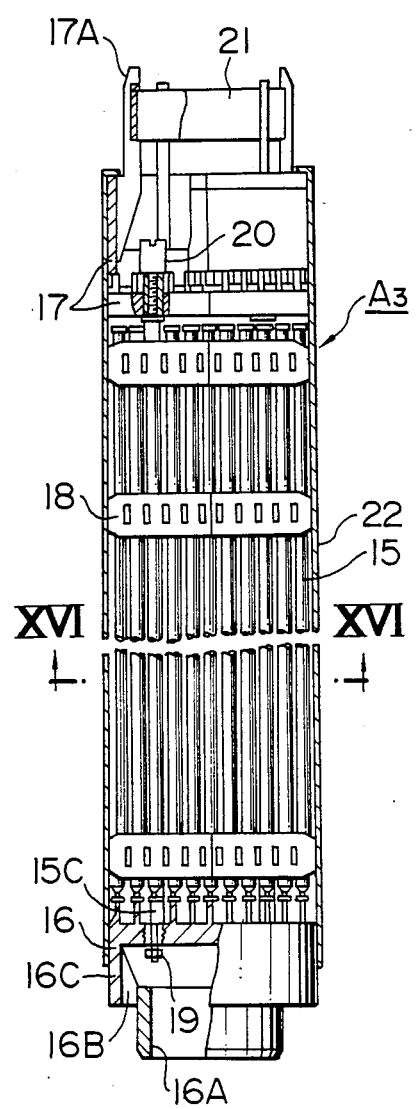
Figure 17:
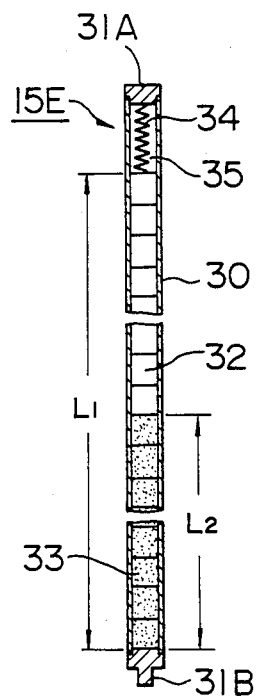
FIG. 17 is a longitudinal sectional view showing a fuel rod shown in FIG. 16.

A fuel assembly in accordance with still another embodiment of the invention will now be described with reference to FIGS. 15 to 17. An outer appearance of the fuel assembly A3 shown in FIG. 15 is the same as that of the fuel assembly A1 shown in FIG. 9. The fuel assembly A3 according to this embodiment uses twelve fuel rods 15E each including gadolinia instead of the twelves fuel rods 15B each including gadolinia of the fuel assembly A1. The other structure of the fuel assembly A3 is the same as that of the fuel assembly A1. The detailed structure of the fuel rod 15E used in the embodiment will now be described with reference to FIG. 17. The fuel rod 15E has a sealed tube 30 sealed at both ends by an upper plug 31A and a lower plug 31B, the sealed tube being filled with two kinds of fuel pellets 32 and 33. The fuel pellets 32 and 33 are made by sintering uranium dioxides, each enrichment being at 6 wt %.

The fuel pellets 32 and 33 each include gadolinia. The concentration of gadolinia of the fuel pellets 32 is 2 wt % and the concentration of gadolinia of the fuel pellets 33 is 3 wt %. In the fuel rod 15E, the fuel pellets 33 are supplied from the lower end of the fuel effective length portion of the fuel rod 15E to a position corresponding to half the entire fuel effective length portion (in the lower portion), and the fuel pellets 32 are supplied from the half position to the upper end of the fuel effective length portion (in the upper portion). In FIG. 17, $L_1$ denotes the entire length of the fuel effective length portion, and $L_2$ denotes the position corresponding to half the entire length of the fuel effective length portion. The concentration of gadolinia of the upper and lower portions is kept constant in the axial direction of each portion. A gas plenum chamber 35 is formed above the upper end of the fuel effective portion within the fuel rod 15E. A coil spring 34 is disposed in this chamber 35 for depressing the fuel pellets. The fuel rod 15A has the same structure as that of the fuel rod 15E shown in FIG. 17 except for the feature that the fuel pellets include no gadolinia. The length of the fuel effective length portion of the fuel rod 15A is equal to that of the fuel rod 15E, and these ords have a constant concentration of 6 wt % over the entire length of the fuel effective length portions.

As described above, the reactivity value of gadolinia is small in the upper portion of the fuel assembly having a large void rate. For this reason, if the gadolinia is arranged uniformly in the axial direction of the fuel assembly, there is a tendency that the burn of gadolinia is slow down in the upper portion of the fuel assembly. In a stage that the burnup has been developed, if the burnable poison material would be left only in the upper portion of the fuel assembly, the difference in reactivity between the upper and lower portions of the fuel assembly is increased due to the reactivity suppressing effect of the upper portion of the fuel assembly, resulting in an increase of the output peaking in the axial direction. In view of such case, according to the present embodiment, the concentration of the gadolinia in the upper portion of the fuel assembly is made smaller than that in the lower portion of the fuel assembly so that the residual period of the gadolinia is kept constant between in the upper and lower portions of the fuel assembly. With such a structure, it is possible to ensure the effect as that of the embodiment shown in FIG. 12, and simultaneously therewith to reduce the difference in void reactivity between the upper and lower portions of the fuel assembly and to eliminate the residual amount of the burnable poison material in the upper portion of the fuel assembly.

According to this embodiment, the number of the fuel rods each containing the burnable poison material in the upper portion of the fuel assembly is the same as that in the lower portion thereof. However, it is possible to adapt the case where the numbers of the fuel rods containing the burnable poison material are different from each other between the upper and lower portions of the fuel assembly by using the fuel rods 15D as in the case of the embodiment shown in FIG. 12, in accordance with the required reactivity control amount in the respective upper and lower portions thereof.

In the foregoing embodiment, the gadolinium is used as the burnable poison material but instead thereof, it is possible to use other neutron absorption nuclides, that is, Cd, Sa and Ta to obtain the same effect.

Figure 12:
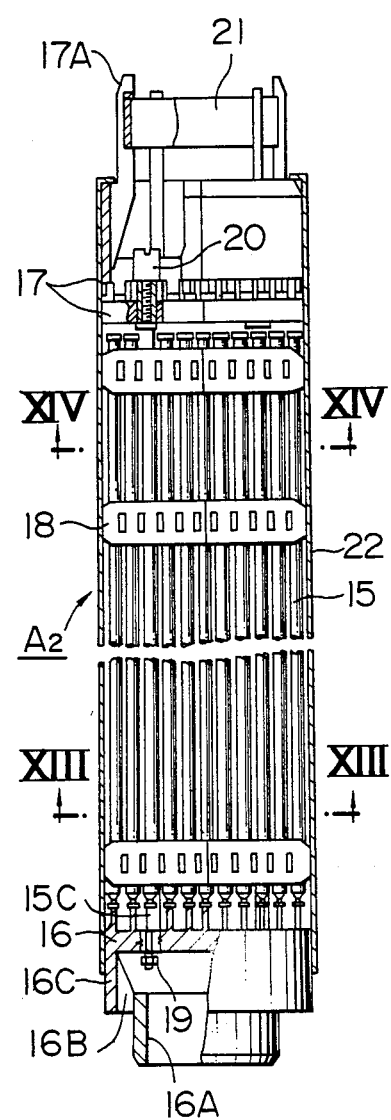
FIGS. 12 and 15 shows longitudinal sectional views showing fuel assemblies in accordance with other embodiments of the invention.

The respective fuel assemblies A2 and A3 in the embodiments shown in FIGS. 12 and 15 may be charged in the central area, high conversion area shown in FIG. 11 instead of the fuel assemblies A1.

Also, the reactor core may be composed of the fuel assemblies A1, A2 and A3 for a high conversion type boiling water reactor composed only of the high conversion area as well as the boiling water reactor having the high conversion area and the burner area.

In the foregoing embodiments, the burnable poison material is used in the form of the additive to the fuel pellets. However, the burnable poison material may be used to be added to a water remover for reducing the amount of the moderator within the fuel assembly or a solid moderator rod for making uniform the moderating effect within the fuel assembly. In this case, the nuclear fuel material and the burnable poison material are separated from each other to further enhance a safety aspect of the fuel assembly.

In the respective fuel assemblies in accordance with the foregoing embodiments, the ratio $R_F$ of the assemblies per se is not greater than 1.5 and the fuel assemblies are charged in the reactor core region where the ratio $R_F$ is not greater than 1.5, to thereby enable to perform the function of the burnable poison material composed of the neutron absorption nuclides having at least one resonant energy in the neutron energy region of one electron volt or less, that is, the function of the reactivity control corresponding to the void rate as described before. Also, in the foregoing assemblies A1, A2 and A3, the enriched uranium dioxide is used as nuclear fuel material upon the charging them into the reactor core but the plutonium is not enriched.

According to the present invention, it is possible to reduce a difference in reactivity concomitant with a change in the void rate and it is possible to increase the reactor stop surplus capacity.

We claim:

1. A fuel assembly for being charged in a high conversion area of a reactor core, comprising a plurality of fuel rods each filled with nuclear fuel material and arranged in rows, an upper tie plate and a lower tie plate for holding opposite ends of each of said fuel rods, and coolant flow paths defined between said fuel rods, coolant flowing from a lower portion to an upper portion of said fuel assembly and voids being generated in the upper portion, wherein a ratio $V_C/V_F$ is not greater than 1.5 within said fuel assembly, where $V_C$ is a volume occupied by the coolant flow paths and $V_F$ is a volume occupied by the nuclear fuel material per unit length in an axial direction of the fuel assembly, and a part of the fuel rods includes a burnable poison material composed of neutron absorption nuclides having at least one resonant energy in a neutron energy region of one electron vole or less, the fuel rods including the burnable poison material being disposed inwardly from an outermost row of other fuel rods of said fuel assembly which do not include a burnable poison material and being surrounded by the other fuel rods.

2. The fuel assembly according to claim 1, wherein said neutron absorption nuclides include one selected from the group consisting of gadolinium, cadmium, samarium and tantalum.

3. The fuel assembly according to claim 1, wherein said ratio $V_C/V_F$ is not greater than 1.3.

4. The fuel assembly according to claim 1, wherein said nuclear fuel material is uranium.

5. A fuel assembly for being charged in a central high conversion area of a reactor core, comprising a plurality of fuel rods each filled with nuclear fuel material and arranged in rows, an upper tie plate and a lower tie plate for holding opposite ends of each of said fuel rods, and coolant flow paths defined between said fuel rods, coolant flowing from a lower portion to an upper portion of said fuel assembly and voids being generated in the upper portion, wherein a ratio $V_C/V_F$ is not greater than 1.5 within said fuel assembly, where $V_C$ is a volume occupied by the coolant flow paths and $V_F$ is a volume occupied by the nuclear fuel material per unit length in an axial direction of the fuel assembly, a part of the fuel rods includes a burnable poison material composed of neutron absorption nuclides having at least one resonant energy in a neutron energy region of one electron volt or less, and in the fuel rods containing said burnable poison material, said burnable poison material is included over an entire axial length of a filling area of said nuclear fuel material of said rods, the fuel rods including the burnable poison material being disposed inwardly from an outermost row of other fuel rods of said fuel assembly which do not include a burnable poison material and being surrounded by the other fuel rods.

6. The fuel assembly according to claim 5, wherein said neutron absorption nuclides include one selected from the group consisting of gadolinium, cadmium, samarium and tantalum.

7. The fuel assembly according to claim 5, wherein said ratio $V_C/V_F$ is not greater than 1.3.

8. A fuel assembly for being charged in a central high conversion area of a reactor core, comprising a plurality of fuel rods each filled with nuclear fuel material, an upper tie plate and a lower tie plate for holding opposite ends of each of said fuel rods, and coolant flow paths defined between said fuel rods, coolant flowing from a lower portion to an upper portion of said fuel assembly and voids being generated in the upper portion, wherein a ratio $V_C/V_F$ is not greater than 1.5 within said fuel assembly, where $V_C$ is a volume occupied by the coolant flow paths and $V_F$ is a volume occupied by the nuclear fuel material per unit length in an axial direction of the fuel assembly, a part of the fuel rods includes a burnable poison material composed of neutron absorption nuclides having at least one resonant energy in a neutron energy region of one electron volt or less, and the fuel rods containing said burnable poison material include first fuel rods and second fuel rods having a shorter axial length than that of said first fuel rods, the fuel rods including the burnable poison material being disposed inwardly from an outermost row of other fuel rods of said fuel assmmbly which do not include a burnable poison material and being surrounded by the other fuel rods.

9. The fuel assembly according to claim 8, wherein said first fuel rods have a nuclear fuel filling area whose axial length is equal to an axial length of a nuclear fuel filling area within the other fuel rods that include nuclear fuel material but no burnable poison material.

10. The fuel assembly according to claim 9, wherein said first rods include said burnable poison material over an entire axial length of said nuclear fuel filling area.

11. The fuel assembly according to claim 8, wherein said neutron abosorption nuclides include one selected from the group consisting of gadolinium, cadmium, samarium and tantalum.

12. The fuel assembly according to claim 8, wherein said ratio $V_C/V_F$ is not greater than 1.3.

13. A fuel assembly for being charged in a high conversion area of a reactor core, comprising a plurality of fuel rods each filled with nuclear fuel material and arranged in rows, an upper tie plate and a lower tie plate for holding opposite ends of each of said fuel rods, and coolant flow paths defined between said fuel rods, coolant flowing from a lower portion to an upper portion of said fuel assembly and voids being generated in the upper portion, wherein a ratio $V_C/V_F$ is not greater than 1.5 within said fuel assembly, where $V_C$ is a volume occupied by the coolant flow paths and $V_F$ is a volume occupied by the nuclear fuel material per unit length in an axial direction of the fuel assembly, a part of the fuel rods includes a burnable poison material composed of neutron absorption nuclides having at least one resonant energy in a neutron energy region of one electron volt or less, and said fuel rods including said burnable poison material are each divided into an upper area and a lower area, a content of said burnable poison material in the lower area being greater than that of said burnable poison in the upper area, the fuel rods including the burnable poison material being disposed inwardly from an outermost row of other fuel rods of said fuel assembly which do not include a burnable poison material and being surrounded by the other fuel rods.

14. The fuel assembly according to claim 13, wherein said fuel rods including said burnable poison material include said burnable poison material over an entire axial length of a nuclear fuel material filling area, and the axial length of said nuclear fuel material filling area of the fuel rods including the burnable poison material is equal to an axial length of the other fuel rods.

15. The fuel assembly according to claim 13, wherein said neutron asbosption nuclides include one selected from the group consisting of gadolinium, cadmium, samarium and tantalum.

16. The fuel assembly according to claim 13, wherein said ratio $V_C/V_F$ is not greater than 1.3.

17. A nuclear reactor having a reactor core including a high conversion area in which a plurality of fuel assemblies each including a plurality of fuel rods that are filled with nuclear material and arranged in rows, and in which coolant is adapted to flow from a lower portion to an upper portion, voids being generated in the upper portion, said nuclear reactor comprising an improvement in which a ratio of $V_{C1}/V_{F2}$ is not greater than 1.5 in said high conversion area where $V_{C1}$ is a volume occupied by coolant flow paths and $V_{F1}$ is a volume oocupied by the nuclear fuel material per unit length in an axial direction of said high conversion area, each of said fuel assembly charged in said high conversion area including said fuel rods, an upper tie plate and a lower tie plate for holding opposite ends of said fuel rods, and coolant flow paths defined between said fuel rods, wherein a ratio $V_C/V_F$ is not greater than 1.5 within said fuel assembly, where $V_C$ is a volume occupied by the coolant flow paths and $V_F$ is a volume occupied by the nuclear fuel material per unit length in an axial direction of the fuel assembly, and a part of the fuel rods includes a burnable poison material composed of neutron absorption nuclides having at least one resonant energy in a neutron energy region of one electron volt or less, the fuel rods including a burnable poison material being disposed inwardly form an outermost row of other fuel rods of said fuel assembly which do not include a burnable poison material and being surrounded by the other fuel rods.

* * * * *